2,680,674

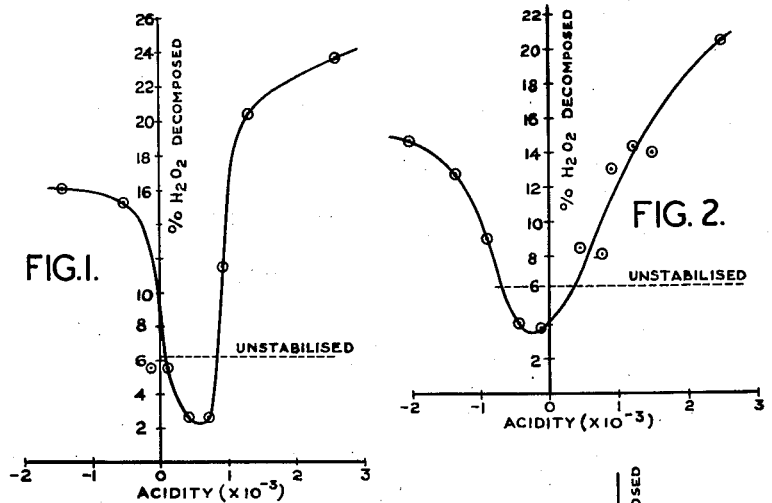
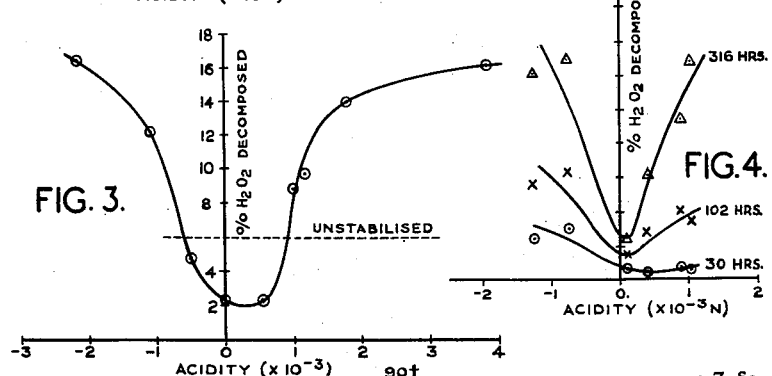
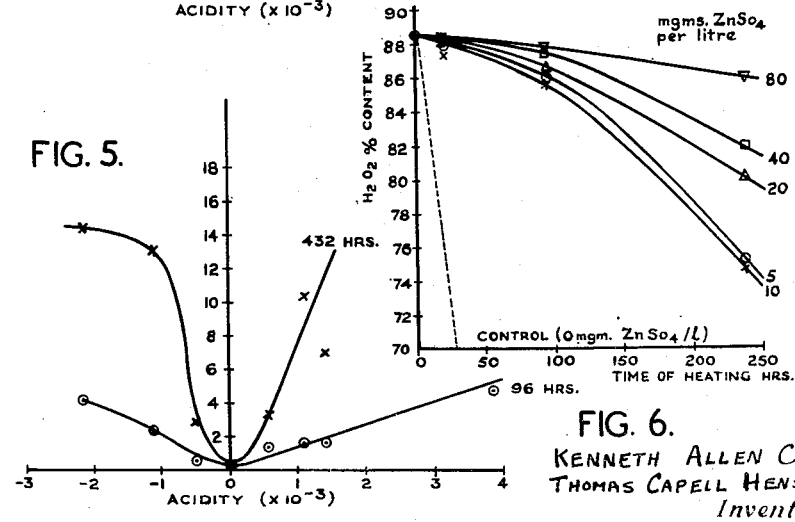
Kenneth Allen Cooper
Thomas Capell Hensman Hill
Inventors Patented June 8, 1954

UNITED STATES PATENT OFFICE 2,680,674

PROCESS FOR STABILIZING HYDROGEN PEROXIDE

Kenneth A. Cooper, Blackheath, London, and Thomas C. H. Hill, Chingford, London, England, assignors, by mesne assignments, to National Research Development Corporation, London, England, a British corporation Application September 15, 1949, Serial No. 115,848

4 Claims. (Cl. 23—207.5)

This invention relates to the stabilisation of hydrogen peroxide and especially to the stabilisation of concentrated solutions of hydrogen peroxide.

The stability and stabilisation of hydrogen peroxide as well as other properties are discussed in a paper to be found in the Transactions of the Electrochemical Society, volume 92, pp. 67–75, 1947 (M. E. Bretscher and E. S. Shanley).

As a result of research and experiment we have now found that concentrated hydrogen peroxide can be effectively stabilised by the addition of a relatively small amount of an ionisable zinc compound or cadmium compound or a mixture of such compounds. The stabilisation is effective even at elevated temperatures up to nearly 100° C.

The object of the invention is to provide a method for the stabilisation of concentrated hydrogen peroxide at atmospheric and also elevated temperatures by the addition of small quantities of soluble zinc salts or cadmium salts, especially the sulphates or nitrates thereof. As is known the elements zinc and cadmium are classified in group IIb of the periodic system of classification and many of their compounds are similar in their chemical properties.

According to the invention a method for the stabilisation of concentrated liquid hydrogen peroxide comprises the addition of the ionisable compound in a proportion of about one milligram equivalent of the said compound per litre of the said peroxide.

The stabilisation is most effective when the acidity of the peroxide solution is adjusted so that the true pH value lies within the range of 3 upwards to 7.

It has been found that the use of a glass electrode calibrated for the determination of pH values of dilute aqueous solutions by a pH meter will give false readings of pH values if the same electrode is used for determining apparent pH values of concentrated hydrogen peroxide. To determine the true pH value it is necessary to calibrate the glass electrode for the peroxide.

A simpler procedure for determining the acidity is the titration method hereinafter described in which alkalinity is regarded as negative acidity. The acidities determined in this way and the corresponding true pH values are approximately as shown in the following table:

| Acidity | pH Value |
|---|---|
| −2 | 6.9 |
| −1 | 6.6 |
| 0 | 4.8 |
| +0.3 | 3.5 |
| +1 | 3.0 |

Satisfactory stabilisation of concentrated hydrogen peroxide solutions containing 70 per cent or more by weight of hydrogen peroxide is attained by the use of about one half of one milligram molecule, or one milligram equivalent, of an ionisable zinc compound or cadmium compound per litre of the peroxide solution. For zinc sulphate about 81 milligrams per litre may be used and for cadmium sulphate about 104 milligrams per litre has been found sufficient as will be seen from the experimental results given in the following description.

In the following will be given the results of a series of comparative tests on hydrogen peroxide solutions stabilized by the method of the invention.

The first series of tests are of thermal stability carried out on small quantities (2 mls. in every case) of hydrogen peroxide. The technique is as follows:

The 2 ml. samples of hydrogen peroxide were introduced into Pyrex tubes of 7 mm. internal diameter, sealed at one end. The open end of each tube was attached, by means of a P. V. C. sleeve, to a Pyrex tube of similar diameter bent over and drawn out to a fine jet. Four such tubes were used for each sample tested, and were immersed in a thermostat at 96° C. for 16 hours to above the hydrogen peroxide level. After this time the $H_2O_2$ remaining was determined by permanganate titration, and the amount of $H_2O_2$ lost expressed as a fraction of that originally present.

Solutions containing the stabilizers (i. e. zinc or cadmium salts) were made up by adding to 100 ml. of hydrogen peroxide either 1 ml. or 2 ml. of a solution of the appropriate salt in twice-distilled water. Blank tests were made with hydrogen peroxide similarly diluted with pure water.

The following is a list of the results. The four results for each sample are given in each case and are averaged. Any figure not averaged is shown in brackets.

Experiment 1

| Sample | Loss in 16 hours at 96° C. (percent) |
|---|---|
| Blank (unstabilised hydrogen peroxide alone). | 15.9, 20.1, 21.4; Mean 19.1. |
| Hydrogen peroxide with 81 mg. per litre $ZnSO_4$. | 1.5, 3.0, 2.4 (6.4); Mean 2.3. |
| Hydrogen peroxide with 104 mg. per litre $CdSO_4$. | 2.5, (6.5), 3.1, 2.8; Mean 2.8. |

Initial $H_2O_2$ concentration in all cases 87.5 percent by weight.

Experiment 2

| Sample | Loss in 16 hours at 96° C. (percent) |
|---|---|
| Blank | 2.1, 18.0, 19.1, 16.4; Mean 18.4 |
| Hydrogen peroxide with 118 mg. per litre $Cd(NO_3)_2$. | 8.2, 7.4, 3.2, 8.6; Mean 6.9. |
| Hydrogen peroxide with 81 mg. per litre $ZnSO_4$. | 2.8, 3.5, 1.4, 2.2; Mean 2.5. |

Initial $H_2O_2$ concentration in both cases 87.1 percent.

The following experiment (No. 3) shows the inhibiting effect of the method of the invention on the catalysis of the decomposition of hydrogen peroxide by copper ions.

Experiment 3

| Sample | Loss in 16 hours 96° C. (percent) |
|---|---|
| Hydrogen peroxide with 0.25 mg. per litre $Cu^{++}$. | 100 (all tubes). |
| Hydrogen peroxide with 0.25 mg. per litre $Cu^{++}$ and 81 mg. per litre $ZnSO_4$. | 3.2, 3.5, 2.0, 2.3; Mean 2.7. |
| Hydrogen peroxide with 1.0 mg. per litre $Cu^{++}$ and 81 mg. per litre $ZnSO_4$. | 6.4, 3.7, 5.2, 5.4; Mean 5.2. |
| Hydrogen peroxide with 3.0 mg. per litre $Cu^{++}$ and 81 mg. per litre $ZnSO_4$. | 11.6, 10.8, 9.7, 8.6; Mean 10.2. |

Initial $H_2O_2$ concentration in all cases 86.8 percent.

Experiment 4

[Showing similar effect to that of Experiment 3, in presence of excess acid.]

| Sample | Loss in 16 hours at 96° C. (percent) |
|---|---|
| (a) Hydrogen peroxide with 0.5 mls. N $10H_2SO_4$ per 100 mls. hydrogen peroxide. | 48.0, (85.7), 54.4, 49.0; Mean 50.5. |
| (b) Hydrogen peroxide acidified as (a) with 0.25 mg. per litre $Cu^{++}$. | 100 (all tubes). |
| (c) Hydrogen peroxide prepared as (b) with 81 mg. per litre $ZnSO_4$. | 6.8, 11.7, 6.5, 8.3; Mean 8.2. |

Initial $H_2O_2$ concentration in all cases: 86.8 percent. N. B. In Experiments 3 and 4 the copper was introduced as cupric sulphate, $CuSO_4.5H_2O$.

Experiment No. 5 which follows, shows the results of comparative tests in the presence of cations other than those used in the method of the invention.

| Sample | Loss in 16 hours at 96° C. |
|---|---|
| Blank | 15.6, 19.8, 21.1; Mean 18.8%. |
| Hydrogen peroxide with $Ba(NO_3)_2$ | 17.1, 22.1, 21.5; Mean 20.2%. |
| Hydrogen peroxide with $Ca(NO_3)_2$ | 19.4, 23.8, 15.8, 16.7; Mean 18.9%. |
| Hydrogen peroxide with $MgSO_4$ | 14.6, 14.5, 13.0, 17.4; Mean 14.9%. |
| Hydrogen peroxide with $Na_2SO_4$ | 17.6, (36.0), 11.3, 21.0; Mean 16.6%. |
| Hydrogen peroxide with $NaNO_3$ | 28.8, 33.4, 32.0, (40.6); Mean 31.4%. |

In each case one-half a milligram atom per litre of the metallic ion was used. This corresponds to the 81 mg. per litre $ZnSO_4$, the 104 mg. per litre $CdSO_4$, and the 118 mg. per litre $Cd(NO_3)_2$, of the previous experiments.

The second series of tests were carried out on larger quantities of hydrogen peroxide—200 mls. in each case—in Jena glass bottles of 250 ml. capacity in ovens at 96° C.

In all the experiments in the series—except Experiment 4—the concentration of added zinc sulphate was 81 mgm. per litre of $H_2O_2$.

*Experiment 1.*—Samples of unstabilised hydrogen peroxide, and of hydrogen peroxide stabilised with 81 mg. per litre $ZnSO_4$, were put on test at 96° C., and the variation of $H_2O_2$ concentration with time was as follows:

| Hours | 0 | 16.7 | 41.7 | 88 | 161 | 361 |
|---|---|---|---|---|---|---|
| Blank, percent $H_2O_2$ | 89.7 | 72.1 | 0.7 | | | |
| Zinc-stabilised sample, percent $H_2O_2$ | 88.6 | 88.4 | 87.8 | 87.4 | 86.4 | 82.9 |

| Hours | 0 | 16.7 | 41.7 | 88 | 161 | 361 | 529 | 703 |
|---|---|---|---|---|---|---|---|---|
| Blank, percent $H_2O_2$ | 89.7 | 72.1 | 0.7 | | | | | |
| Zinc-stabilised sample, percent $H_2O_2$ | 88.6 | 88.4 | 87.8 | 87.4 | 86.4 | 82.9 | 80.8 | 77.3 |

*Experiment 2.*—Similar to Experiment 1, done at 96° C., but with a lower initial concentration of $H_2O_2$.

| Hours | 0 | 26 | 50 |
|---|---|---|---|
| Blank, percent $H_2O_2$ | 54.2 | 23.6 | 0 |
| Zinc-stabilised sample, percent $H_2O_2$ | 54.2 | 50.8 | 46.2 |

*Experiment 3.*—Similar to Experiment 1, done at 96° C., but with a still lower initial concentration of $H_2O_2$.

| Hours | 0 | 18 | 39 | 60 |
|---|---|---|---|---|
| Blank, percent $H_2O_2$ | 28.9 | 14.0 | 0 | |
| Zinc-stabilised sample, percent $H_2O_2$ | 28.9 | 25.7 | 24.0 | 22.7 |

*Experiment 4.*—Experiment under similar conditions of Experiment 1, at 96° C., with varying concentrations of $ZnSO_4$ (all calculated as anhydrous).

The results are shown graphically in Fig. 6 of the drawings.

| Hours | 0 | 46 | 94 | 238 |
|---|---|---|---|---|
| Blank, percent $H_2O_2$ | 88.6 | 58.2 | 0 | |
| Hydrogen peroxide with 5 mg. per litre $ZnSO_4$, percent $H_2O_2$ | 88.6 | 87.7 | 86.3 | 75.1 |
| Hydrogen peroxide with 10 mg. per litre $ZnSO_4$, percent $H_2O_2$ | 88.6 | 87.4 | 85.7 | 74.9 |
| Hydrogen peroxide with 20 mg. per litre $ZnSO_4$, percent $H_2O_2$ | 88.6 | 87.8 | 86.7 | 80.1 |
| Hydrogen peroxide with 40 mg. per litre $ZnSO_4$, percent $H_2O_2$ | 88.6 | 88.2 | 87.5 | 81.9 |
| Hydrogen peroxide with 80 mg. per litre $ZnSO_4$, percent $H_2O_2$ | 88.6 | 88.3 | 87.7 | 85.9 |

In the third series of tests we have found that the stabilising effect of zinc ions is exercised in presence of aluminium (the metal used for practical storage of concentrated hydrogen peroxide). The tests were made at 50° C. (122° F.), representing severe tropical conditions, 200 ml. samples of hydrogen peroxide initially of 89.4 per cent. concentration (w./w.) were heated in 250 ml. Jena-glass bottles, in an air-oven at 50° C., with a strip of 99.5 per cent. purity aluminum of 10 cm. x 2 cm. x 0.15 cm.

dimensions, three-quarters immersed. The $H_2O_2$ concentration was measured after 6 months. Duplicate tests were made. The table shows the initial and final per cent $H_2O_2$.

|  | Time, months | |
| --- | --- | --- |
|  | 0 | 6 |
| Experiment 5: |  |  |
| Stabilised Sample (80 mg. per litre $ZnSO_4$) | 89.4 | 81.4 |
| Control Sample | 89.4 | 6.0 |
| Experiment 6: |  |  |
| Stabilised Sample (80 mg. per litre $ZnSO_4$) | 89.4 | 86.6 |
| Control Sample | 89.4 | 6.0 |

In the fourth series of tests, an examination was made of the variation of the stabilising effect with acidity. This was carried out under the following conditions:

(a) With 80 mg. per litre $ZnSO_4$ ($\equiv 0.5$ mg.-atom per litre Zn), in small tubes kept at 96° C. for 16 hours.

(b) With 104 mg. per litre $CdSO_4$ ($\equiv 0.5$ mg.-atom per litre Cd), in small tubes kept at 96° C. for 16 hours.

(c) With 40 mg. per litre $ZnSO_4$ plus 52 mg. per litre $CdSO_4$ ($\equiv 0.25$ mg.-atom per litre of each element), in small tubes kept at 96° C. for 16 hours.

A scale of acidity-alkalinity units was defined as follows:

10 ml. samples of concentrated hydrogen peroxide diluted with 90 ml. water, were titrated with N/100 acid or alkali, using methyl red screened with methylene blue. The number of cc. of N/100 alkali required for neutralisation is regarded as the acidity of the concentrated hydrogen peroxide in milliequivalents per litre and is referred to in terms of acidity-alkalinity units. If N/100 acid instead of alkali is used, the number of cc. required is quoted as a negative acidity. Fresh concentrated hydrogen peroxide usually has, on this scale, an acidity between +0.3 and +1.0 unit.

*Experiment 7.*—The per cent decomposition in small-tube tests is given in the table below. The data are plotted in Figs. 1, 2 and 3.

(a) With 80 mg. per litre $ZnSO_4$ (Fig 1).

[Concentration of $H_2O_2$ initially 89.4% w./w.]

| Acidity | −1.43 | −0.55 | +0.09 | +0.43 | +0.67 | +0.96 |
| --- | --- | --- | --- | --- | --- | --- |
| Percent $H_2O_2$ decomposed | 16.1 | 15.4 | 5.6 | 2.7 | 2.6 | 11.5 |
| Acidity | +1.30 | +2.57 |  |  |  |  |
| Percent $H_2O_2$ decomposed | 20.5 | 23.6 |  |  |  |  |

(b) With 104 mg. per litre $CaSO_4$ (Fig. 2)

[Concentration of $H_2O_2$ initially 89.4% w./w.]

| Acidity | −2.05 | −1.37 | −0.90 | −0.47 | −0.13 |  |
| --- | --- | --- | --- | --- | --- | --- |
| Percent $H_2O_2$ decomposed | 14.6 | 12.8 | 9.1 | 4.0 | 3.9 |  |
| Acidity | +0.45 | +0.76 | +0.90 | +1.22 | +1.48 | +2.47 |
| Percent $H_2O_2$ decomposed | 8.5 | 8.1 | 13.0 | 14.3 | 14.0 | 20.8 |

(c) With 40 mg. per litre $ZnSO_4$ plus 52 mg. per litre $CaSO_4$ (Fig. 3).

[Concentration of $H_2O_2$ initially 88.8% w./w.]

| Acidity | −2.15 | −1.09 | −0.48 | +0.01 | +0.56 |
| --- | --- | --- | --- | --- | --- |
| Percent $H_2O_2$ decomposed | 16.3 | 12.1 | 4.7 | 2.4 | 2.3 |
| Acidity | +1.02 | +1.18 | +1.80 | +3.85 |  |
| Percent $H_2O_2$ decomposed | 8.9 | 9.8 | 14.0 | 16.2 |  |

These data show that the use of the zinc and cadmium together gives a considerable increase in the range of acidity over which stabilisation takes place. The same conclusion follows from the tests in presence of aluminium. The results appear below and in Figs. 4 and 5.

(d) With 80 mg. per litre $ZnSO_4$. 200 ml. samples in 250 ml. Jena-glass bottles, with a piece of 99.5% aluminium, 10 x 2 x 0.2 cm., three-quarters immersed. Concentration of $H_2O_2$ initially 89.4% w./w. The table shows the per cent of the original amount of $H_2O_2$ decomposed. The results are also plotted in Fig. 4 of the drawings.

| Acidity | Time of Heating (hours) | | |
| --- | --- | --- | --- |
|  | 30 | 102 | 316 |
| −1.25 | 1.2 | 2.8 | 6.1 |
| −0.75 | 1.5 | 3.2 | 6.5 |
| +0.09 | 0.3 | 0.7 | 1.2 |
| +0.39 | 0.2 | 1.4 | 3.1 |
| +0.90 | 0.4 | 2.0 | 4.7 |
| +1.03 | 0.3 | 1.7 | 6.4 |

(e) With 40 mg. per litre $ZnSO_4$ plus 52 mg. per litre $CdSO_4$. Initial concentration of $H_2O_2$ 88.8% w./w. Conditions as under (d). The results are shown graphically in Fig. 5 of the drawings.

| Acidity | Time of Heating (hours) | | |
| --- | --- | --- | --- |
|  | 96 | 432 | 594 |
| −2.15 | 4.2 | 14.3 |  |
| −1.09 | 2.4 | 13.1 |  |
| −0.48 | 0.6 | 2.9 | 3.7 |
| +0.01 | 0.2 | 0.4 | 1.5 |
| +0.56 | 1.4 | 3.3 | 4.2 |
| +1.18 | 1.7 | 10.4 |  |
| +1.40 | 1.7 | 7.0 |  |
| +3.85 | 4.8 | 74.9 |  |

The fifth set of experiments was made at room temperature on the photochemical decomposition of hydrogen peroxide. Each sample of hydrogen peroxide was placed in a small quartz cell, of the type used in a Spekker photometer, of capacity about 2 mls. The cells were placed at equal distances from a mercury ultra-violet lamp, and were given the same time of exposure. The loss in weight in each cell was observed and from it the percentage of $H_2O_2$ decomposed was calculated. Concentrations of one-half milligram-atom of Zn and Cd were used in all these experiments and these metals were always put in as sulphates.

Experiment 8

Time of exposure: 4 hours.
Distance of cells from lamp: 10 inches.
Per cent $H_2O_2$ initially: 88 per cent.
Per cent $H_2O_2$ decomposed: Blank 1.47 per cent.
  Zinc-stabilized sample 0.06 per cent.

Experiment 9

Time of exposure: 2 hours.
Distance of cells from lamp: 8 inches.
Per cent $H_2O_2$ initially: 87 per cent.
Per cent $H_2O_2$ decomposed: Blank 0.80 per cent.
  Zinc-stabilized sample 0.18 per cent.
  Cadmium-stabilized sample 0.29 per cent.

The results of the fifth set of experiments shows that zinc and cadmium ions also inhibit the photochemical decomposition of hydrogen peroxide.

We claim:

1. A method of stabilization of concentrated liquid hydrogen peroxide which comprises determining the acidity value, adjusting the acidity value to a predetermined value corresponding to a true pH value between 3 and 7 and then introducing from 20 to about 81 milligrams of zinc sulphate per litre of hydrogen peroxide.

2. A method of stabilization of concentrated liquid hydrogen peroxide containing at least 70 per cent of peroxide, which method comprises determining the acidity value, adjusting the acidity value to a predetermined value corresponding to a true pH value between 3 and 7 and then introducing an ionisable oxy-salt selected from the group consisting of nitrate and sulphate of an element selected from the group consisting of zinc and cadmium, the proportion of the said salt introduced being about one milligram equivalent per litre of the hydrogen peroxide.

3. A method of stabilization of concentrated liquid hydrogen peroxide which comprises determining the acidity value, adjusting the acidity value to a predetermined value corresponding to a true pH value between 3 and 7 and then introducing from 50 to 104 milligrams of cadmium sulphate per litre of hydrogen peroxide.

4. A method of stabilization of concentrated liquid hydrogen peroxide which comprises determining the acidity value, adjusting the acidity value to a predetermined value corresponding to a true pH value between 3 and 7 and then introducing a mixture of zinc sulphate and cadmium sulphate, the total quantity of the said mixture being equivalent to the addition of not more than one half of 81 milligrams of zinc sulphate together with not more than one half of 104 milligrams of cadmium sulphate per litre of hydrogen peroxide.

References Cited in the file of this patent

UNITED STATES PATENTS

| Number | Name | Date |
|---|---|---|
| 2,224,835 | Reichert et al. | Dec. 10, 1940 |
| 2,368,806 | Cook | Feb. 6, 1945 |

FOREIGN PATENTS

| Number | Country | Date |
|---|---|---|
| 16,151 | Great Britain | of 1905 |

OTHER REFERENCES

Quartaroli: "Chem. Abstracts," vol. 21, page 2088, 1927.

Bretachger et al.: "Trans. Elec. Chem. Soc.," vol. 92, pages 67–75, 1947.

"Industrial and Engineering Chemistry," March 1946, pages 310–320.

Jacobson: "Encyclopedia of Chemical Reactions," vol. II, 1948, page 27.